Figure 1:
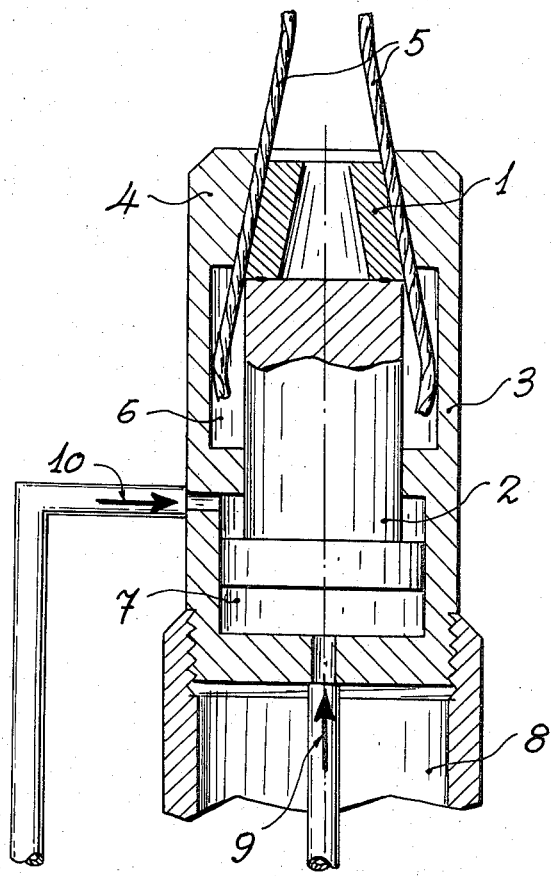

United States Patent
De Valenzuela

[11] 3,811,652
[45] May 21, 1974

[54] SYSTEMS OF ANCHORAGE TO THE TRACTION JACK OF REINFORCEMENTS TO BE POST-TENSIONED

[76] Inventor: Ricardo Barredo De Valenzuela, Raimundo Fernandez Villaverde 45, Madrid 3, Spain

[22] Filed: May 4, 1972

[21] Appl. No.: 250,192

[30] Foreign Application Priority Data
Feb. 8, 1972   Spain .................................. 399570

[52] U.S. Cl............................................. 254/29 A
[51] Int. Cl............................................. E21b 19/00
[58] Field of Search........... 24/126 L; 254/29 A, 51

[56] References Cited
UNITED STATES PATENTS
2,686,963   8/1954   Freyssinet ......................... 24/126 L
3,035,813   5/1962   Horel et al......................... 254/29 A
3,676,900   7/1972   De Valenzuela .................. 24/126 L

FOREIGN PATENTS OR APPLICATIONS
772,858   4/1957   Great Britain ..................... 254/29 A

*Primary Examiner*—Othell M. Simpson

[57] ABSTRACT

The present invention relates to an improvement in an anchoring device for post-tensioning reinforcement elements by a cooperating traction jack, and a conical wedge and mating interior conical ring of the traction jack. In accordance with the invention, a truncated conical wedge is solidly united to the head of a hydraulic piston, the cylinder of which has fixed to its front end an interior conical ring acting in conjunction with the wedge in order to fix the terminal ends of the rods or cables. The ends of the rods or cables enter into the anterior chamber of the body of the cylinder part of the body of the cylinder has an external screw-thread to which there is directly coupled the front extremity of the body of the traction jack.

3 Claims, 2 Drawing Figures

PATENTED MAY 21 1974   3,811,652

SYSTEMS OF ANCHORAGE TO THE TRACTION JACK OF REINFORCEMENTS TO BE POST-TENSIONED

The present invention is concerned with improvements in an anchoring device utilizing a traction jack for clamping reinforcements to be post-stressed.

In the art of post-tensioning of metal reinforcing elements or beams used in construction, various types of devices have been employed to fix the ends of the rods or cables that constitute the reinforcements and which make it possible to apply to all the rods or cables simultaneously the same clamping force. The majority of such devices include tightening elements which are wedged in the interior of other elements to ensure the joint and simultaneous fixing of the said rods or cables.

One prior art means for fixing the ends of reinforcement members is disclosed in U.S. Pat. No. 3,676,900. Such a means comprises a wedge which permits the tractive force to be applied axially with the same effectiveness both in the case of rods and of cables, the wedge being susceptible to undergoing radial distortion; the system includes a truncated conical wedge, with a wall of uniform thickness and having longitudinal distorting grooves distributed equidistantly over the inner surface, and coinciding with some semi-circular external channels which act in conjunction with other complementary channels made on the inner surface of a ring which has a conical character analogous to that of the wedge, for the purpose of accomplishing the joint fixing of all the ends of the cables or rods of the reinforcement to be post-tensioned. However, such devices have not been reliably utilized in conjunction with a traction jack.

The improvements in accordance with the present invention completely overcome the disadvantages noted above, being based on the mechanics of the truncated conical wedge, the subject of U.S. Pat. No. 3,676,900 to which reference has been made above, but which has been considerably improved with respect to its operation and behaviour on its being included in a hydraulic device. The hydraulic device is releasably connectable to a hydraulic fluid source to effectuate the tightening or anchorage of the terminal pieces of the reinforcement to be post-tensioned and their release, if desired.

In order that the purpose of the present invention may be better understood, and merely by way of example, there is annexed a sheet of drawings in which there is schematically represented the diametric section of an improved system of anchorage in accordance with the present invention, which system is directly attached to the traction jack.

Figure 2:
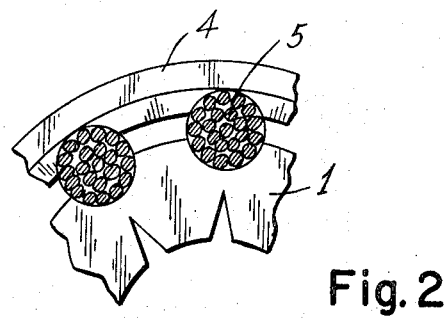

In the drawing,

FIG. 1 shows a longitudinal sectional view of the anchorage device and traction jack, and FIG. 2, shows a partial front view of the ends of the cables anchored according to the system corresponding to this invention.

In the drawing and in the following description, the elements constituting the whole and its principal parts have been designated in accordance with the following nomenclature:

1.- Truncated conical wedge
2.- Hydraulic piston
3.- Cylinder
4.- Interior conical ring
5.- Terminals of the rods or cables
6.- Anterior chamber
7.- Pressure chamber
8.- Traction jack
9.- Posterior inlet
10.- Front inlet With reference to the drawing the truncated conical wedge 1 whose characteristics are detailed in U.S. Pat. No. 3,676,900, is solidly united in an appropriate manner to the head of a hydraulic piston 2 whose cylinder 3 has attached at its front end the interior conical ring 4 which acts in conjunction with the truncated conical wedge 1 in order to fix the ends of the terminals of the rods or cables 5 which are caused to enter into the -- anterior chamber 6 of the cylinder 3, whose watertightness is maintained by known means.

The posterior part of the body of the cylinder 3 has an external screw-thread on which there is directly coupled the front extremity of the body of the traction jack 8.

The pressure chamber 7 is fitted with a posterior inlet 9 and with a front inlet 10 to which, alternately and in accordance with the operation of an appropriate shutoff cock (not shown in the drawing) there arrives fluid under pressure from the traction jack itself 8.

The position represented in the sheet of drawings is that which results from the arrival of fluid to the pressure chamber 7 through the posterior inlet 9; the piston 2 and, together with it, the truncated conical wedge 1 are thrust forward, and the terminals 5 of the rods or cables are strongly fixed in the interior of channels formed in the truncated conical wedge 1, and those on the interior conical ring 4 which acts in conjunction therewith.

In this position, once the anchorage of the terminal 5 has been achieved, there is brought into service the traction jack 8 which effects the post-tensioning of the reinforcement.

On the termination of the post-tensioning, the retention of the bundle of terminals 5 subjected to traction is achieved by means of any known device and, preferably, by means of a complex apparatus constituted by a wedging crown and an external ring acting in conjunction, therewith included in the improvements which are the subject of the above-mentioned U.S. Patent 3,676,900.

Once the means of retention have been applied to the terminals 5 of the reinforcement subjected to traction, the shutoff cock is inverted so that it opens the way to the arrival of fluid under pressure through the front inlet 10 at the same time that it permits discharge through the posterior inlet 9; the piston 2 retracts and causes to move together with it the – truncated conical wedge 1, leaving the terminals 5 free.

The nature of the invention having been sufficiently described, together with an example for its practical implementation, there only remains to add that the characteristics of size, form and material, with particular reference to each one of the elements that constitute the whole may be varied without departing from the spirit or scope of the invention. The description should be taken in its broadest sense and not as a limitation of possibilities of implementation.

What is claimed is:

1. In an anchorage device for post-tensioning reinforcement elements, including a traction jack cooperating with a truncated hollow conical wedge, the wedge having distortion grooves running longitudinally of the axis of the wedge and along the inner surface of the hollow wedge, the wedge also having a longitudinal exterior channel opposite each distortion groove, the improvement wherein said traction jack comprises a detachable nose member threadably coupled at one end to the output connection of the traction jack, the nose member housing said wedge and comprising: a hydraulic piston member having a piston head solidly affixed to the base of said wedge; a cylinder for said piston; an interior conical ring at the end of said nose member opposite the threaded end, said interior conical ring having longitudinal internal channels complementary to and disposed opposite the exterior channels of said wedge, each pair of opposed channels adapted to accept a reinforcing element the ends of which are caused to enter into an internal chamber formed between the body of the nose member and the piston head.

2. The improvement as claimed in claim 1, wherein said piston member includes a main piston portion slidable within said cylinder, said piston head being of smaller diameter than said main piston portion.

3. The improvement as claimed in claim 2, wherein said cylinder communicates with a posterior inlet disposed at the threaded end of said nose member and an anterior inlet disposed anteriorly of said main piston portion, such that fluid under pressure may be forced into either inlet to cause, when the fluid is forced into said posterior inlet, the piston and wedge to be thrust forwardly clamping said reinforcing elements in said channels, and to cause, when the fluid is forced into said anterior inlet, the piston and wedge to be thrust rearwardly releasing said reinforcing elements from the channels.

* * * * *